(12) United States Patent
Flory

(10) Patent No.: US 7,027,679 B1
(45) Date of Patent: Apr. 11, 2006

(54) RESONANT COUPLING OF OPTICAL SIGNALS FOR OUT-OF-PLANE TRANSMISSION THAT INCLUDES OUTPUT BEAM MODIFICATION

(76) Inventor: Curt Alan Flory, 774 Raymundo Ave., Los Altos, CA (US) 94024

( * ) Notice: Subject to any disclaimer, the term of this patent is extended or adjusted under 35 U.S.C. 154(b) by 26 days.

(21) Appl. No.: 10/948,641

(22) Filed: Sep. 23, 2004

(51) Int. Cl.
*G02B 6/42* (2006.01)
*G02B 6/29* (2006.01)

(52) U.S. Cl. .............................. 385/15; 385/42; 385/27

(58) Field of Classification Search .................. 313/15, 313/40
See application file for complete search history.

(56) References Cited

U.S. PATENT DOCUMENTS

| | | | |
|---|---|---|---|
| 5,357,591 A * | 10/1994 | Jiang et al. .................... | 385/37 |
| 5,377,285 A * | 12/1994 | Podgorski ..................... | 385/27 |
| 5,712,605 A | 1/1998 | Flory et al. | |
| 6,852,556 B1 * | 2/2005 | Yap .............................. | 385/132 |
| 6,920,253 B1 * | 7/2005 | Tan et al. .................... | 385/130 |
| 2002/0122615 A1 * | 9/2002 | Painter et al. ................. | 385/15 |
| 2003/0194169 A1 | 10/2003 | Flory | |
| 2004/0114867 A1 * | 6/2004 | Nielsen et al. ................ | 385/40 |
| 2004/0120638 A1 * | 6/2004 | Frick ........................... | 385/27 |

* cited by examiner

*Primary Examiner*—Joseph Williams
*Assistant Examiner*—Peter Macchiarolo

(57) ABSTRACT

An optical structure is formed on a surface of the optically resonant system to modify a characteristic of the emitted resonant signal. The optical structure may be configured to impart a phase-shift on a portion of the resonant signal. Because the resonant signal consists of a single resonant mode with an axially symmetric radiation pattern, a phase-shift can be used to, for example, collimate, disperse, direct, and generally shape output characteristics of the emitted resonant signal. The optical structure can also be used to tune the quality factor (Q) of the optically resonant system.

20 Claims, 11 Drawing Sheets

US 7,027,679 B1

RESONANT COUPLING OF OPTICAL SIGNALS FOR OUT-OF-PLANE TRANSMISSION THAT INCLUDES OUTPUT BEAM MODIFICATION

CROSS-REFERENCE TO RELATED APPLICATION

This application is related to U.S. patent application Ser. No. 10/123,656, filed Apr. 16, 2002 and entitled RESONANT COUPLING OF OPTICAL SIGNALS FOR OUT-OF-PLANE TRANSMISSION.

BACKGROUND OF THE INVENTION

Nanoscale integrated optical devices are rapidly achieving signal generation and processing functionality previously restricted to the purely electronic domain. These nanoscale devices, which are typically planar, normally include a planar waveguide supported by a substrate with the planar waveguide confining light in the substrate. However, it can be difficult to efficiently couple an optical signal out of a planar waveguide in an out-of-plane direction for either free space transmission or, more typically, for coupling to an optical fiber. Additionally, an optical signal that is extracted out of a planar substrate in an out-of-plane direction has mode properties that are dependent upon the particular architecture of the extraction system and the mode properties may not be entirely compatible with the desired application. External bulk optical elements have been used to shape an extracted beam to achieve a desired emission characteristic. For example, an external lens such as a cylindrical or ball lens can be used to focus an extracted beam into an adjacent optical fiber. However, size and alignment limitations of bulk optical elements can make their use with integrated optical elements problematic.

SUMMARY OF THE INVENTION

An optical system includes an optically resonant system formed in a planar substrate to emit a resonant optical signal in an out-of-plane direction relative to the substrate and an optical structure formed on a surface of the optically resonant system to modify a characteristic of an emitted resonant signal. For example, the optical structure is a dielectric layer that is configured to impart a phase-shift on a portion of the resonant signal. Because the resonant signal consists of a single resonant mode with an axially symmetric radiation pattern, a phase-shift can be used to, for example, collimate, disperse, direct, and generally shape output characteristics of the emitted resonant signal. The optical structure can also be used to tune the quality factor (Q) of the optically resonant system.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The invention is described with reference to the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1:
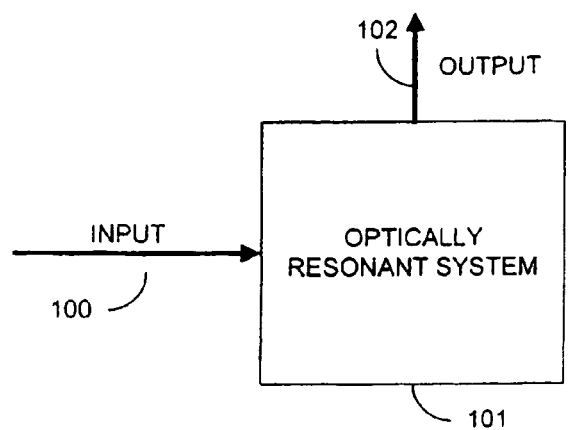
FIG. 1 is a block diagram illustrating an embodiment of an optically resonant system of the present invention.

Referring now to FIG. 1, an optical input signal 100 is provided to an optically resonant system 101. The optically resonant system 101 captures energy of the optical input signal 100 through resonant characteristics of the optically resonant system 101. The optically resonant system 101 then emits an optical output signal 102. By way of example, the optical output signal could be emitted orthogonal to the optical input signal 100.

The optical input signal 100 in different embodiments could be travelling in a number of different media, including an optical fiber waveguide, a dielectric waveguide, free space, etc. The optical output signal 102 that is emitted may be attenuated, but typically retains any "information content" that may have been encoded on the optical input signal 100. The optical output signal 102 in one embodiment, among others, has an axially symmetric radiation pattern that is ideal for coupling the output signal into an optical fiber, or another integrated optical device.

Figure 2:
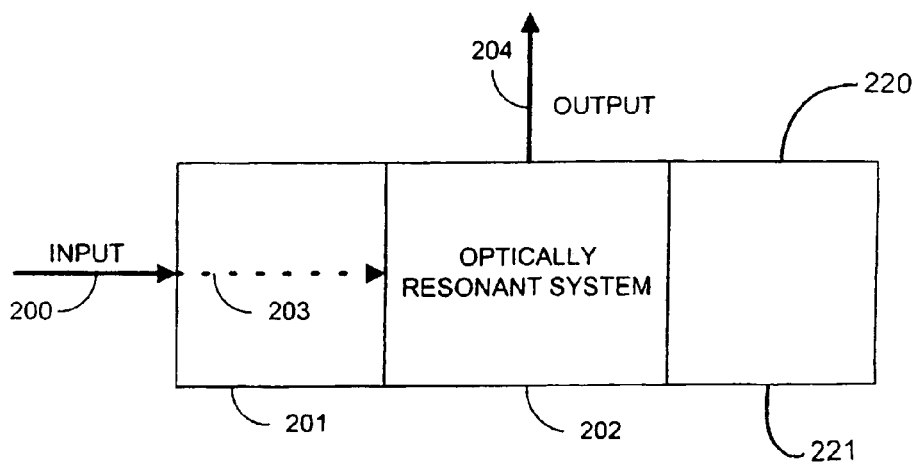
FIG. 2 is a block diagram illustrating an alternative embodiment of an optically resonant system of the present invention.

Referring now to FIG. 2, shown is a block diagram of an alternative embodiment of the present invention. In this embodiment, an optical input signal 200 travels into a substrate region 201, near an optically resonant system 202. The optically resonant system 202 captures a portion of the signal and generates an optical output signal 204. By way of example, the optical input signal travels in a direction that is substantially parallel to the top and bottom surfaces 220 and 221 of the substrate region and the optical output signal could be emitted in a direction orthogonal to the optical input signal 200.

The optically resonant system works by capturing the evanescent fields 203 associated with the optical input signal 200 in the optically resonant system 202. Evanescent fields are created when a signal is propagating in a waveguide. The optical input signal, due to its electromagnetic nature, inherently develops an evanescent field surrounding the waveguide. The evanescent field 203 created proximal to the optically resonant system by the optical input signal 200 resonates with at least one mode of the optically resonant system 202, causing optical energy to be transferred into the optically resonant system 202. The optically resonant system 202 then preferentially emits the optical energy in a desired direction to produce the optical output signal 204. The optical output signal 204 created by the optically resonant system 202 may be attenuated, but typically retains any "information content" that may have been encoded on the input signal 200. The output signal 204 in one embodiment, among others, has an axially symmetric radiation pattern that is ideal for coupling the optical output signal into an optical fiber, or into another integrated optical device.

Figure 3:
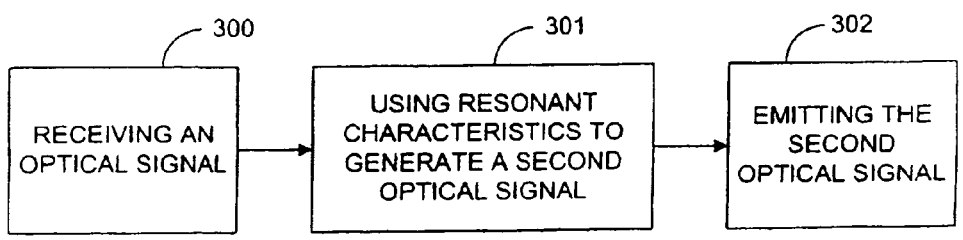
FIG. 3 is a flowchart illustrating a method for using the optically resonant system of FIG. 2.

Referring now to FIG. 3, shown is an embodiment of a method of using the optically resonant system of FIG. 2. At block 300, the optically resonant system receives an optical signal. In block 301, resonant characteristics are used to generate a second optical signal. Then, in block 302, the second signal is emitted.

As an example, the optically resonant system typically receives an optical signal through a waveguide. This waveguide can terminate in the optically resonant system, or alternatively, the waveguide can continue through the optically resonant system. In either case, the evanescent fields which extend outside the waveguide allow coupling of the optical signal to the optically resonant system. An asymmetrical containment profile of the optically resonant system can allow the optically resonant system to preferentially emit the second optical signal. The emitted optical signal can then be coupled to another integrated optical device or simply an optical fiber to transport the emitted optical signal to another location.

Figure 4:
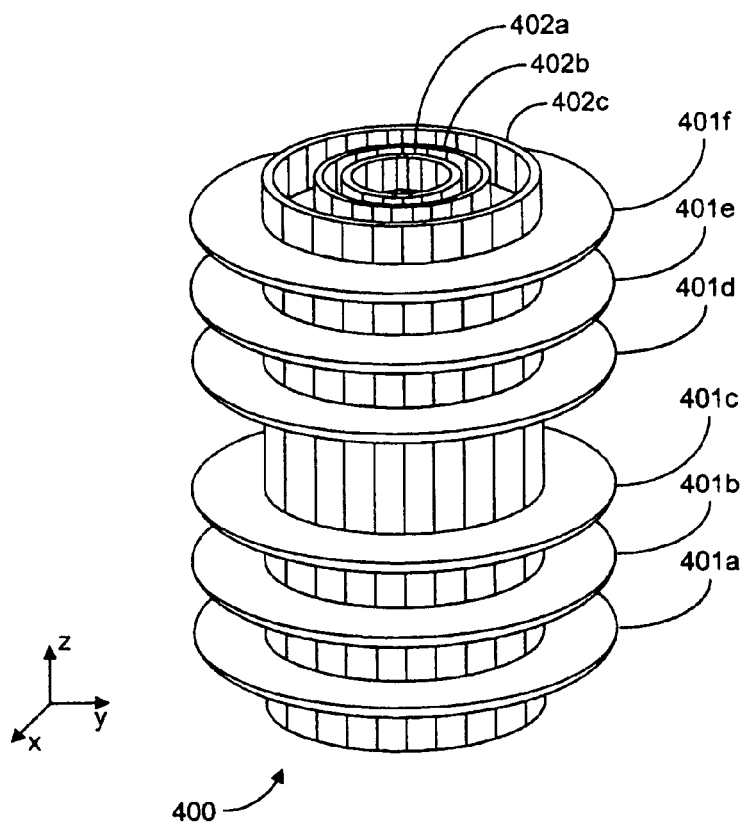
FIG. 4 is a schematic diagram of an embodiment of an optically resonant system of the present invention.

Referring now to FIG. 4, shown is a schematic diagram of an embodiment of the optically resonant system. The present embodiment of the optically resonant system, shown in free space, includes a dielectric structure 400. The dielectric structure 400 involves a first structure of dielectric parallel plates 401a–f, and a second structure of dielectric concentric cylinders 402a–c. The first structure of the optically resonant system overlaps, and is in optical communication with, the second structure of the optically resonant system to capture at least a portion of an optical input signal. The first and second structures then operate to emit an output signal. By way of example, the optical output signal can be emitted in a direction orthogonal to the optical input signal.

Figure 5:
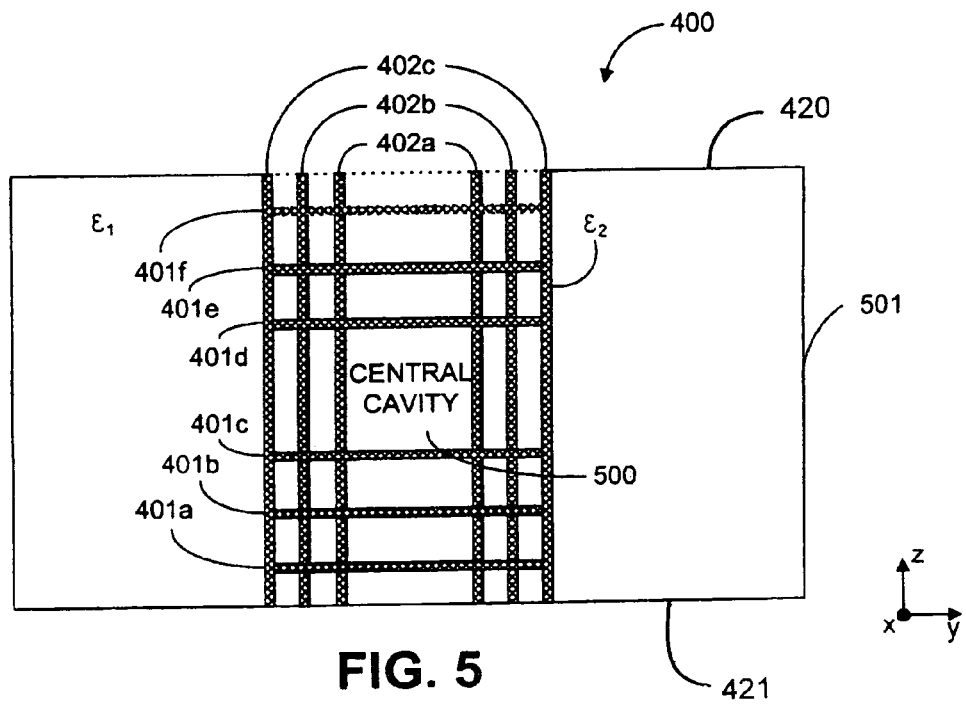
FIG. 5 is a cross-sectional view of the optically resonant system of FIG. 2, showing the resonant cavity formed in an optical substrate.

Referring now to FIG. 5, shown is a cross-sectional view of one embodiment, among others, of the optically resonant system of the present invention. The optically resonant system 400 includes a plurality of plates 401a–f and a plurality of cylinders 402a–c which intersect with each other to form a central cavity 500 with resonant characteristics. Each of the plates 401a–f resides in the x-y plane, and partially reflects optical energy along the z-axis, orthogonal to the x-y plane. Each of the cylinders 402a–c partially reflects light in the radial direction, parallel to the x-y plane. Typically, the plates 401a–f and cylinders 402a–c are formed from the same dielectric material or similar dielectric materials. For example, one such dielectric material that could be used is silicon. A surrounding material, or optical substrate 501 having substantially parallel surfaces 420 and 421, is typically formed from a dielectric material having a lower dielectric constant than the material which forms the plates 401a–f and cylinders 402a–c. In an exemplary embodiment, a typical dielectric constant for the plates and cylinders could be about 11, and a typical dielectric constant for the surrounding material could be about 2. However, one skilled in the art will recognize that many different pairs of dielectric constants can operate to form the optically resonant system and the invention is not limited to merely the dielectric constants disclosed. When the plates 401a–f and cylinders 402a–c are combined as in FIG. 5, the plates 401a–f and cylinders 402a–c operate to capture certain wavelengths of light. These wavelengths of light are captured according to the dimensions and materials of the optically resonant system 400, as is described in U.S. patent application Ser. No. 10/123,656, filed Apr. 16, 2002 and entitled RESONANT COUPLING OF OPTICAL SIGNALS FOR OUT-OF-PLANE TRANSMISSION, which is assigned to the assignee of the current application and incorporated by reference herein.

The optically resonant system 400, shown formed in an optical substrate 501, can generally be described as an out-of-plane coupler used to redirect an optical signal in an out-of-plane direction, and more specifically as a three dimensional distributed Bragg reflector. In general terms, the optically resonant system 400 captures light through the resonant characteristics of the system. The characteristics of the optically resonant system are defined according to the dimensions of the system and refraction properties of the dielectric materials comprising the system.

In the embodiment shown in FIG. 5, the optically resonant system 400 has a symmetrical radiation pattern, radiating captured optical energy substantially in all directions. This radiation pattern can be altered by modifying structure of the optically resonant system 400. This modification of the optically resonant structure can be achieved by modifying the fabrication of the optically resonant system 400 or by modifying the optically resonant system 400 after fabrication.

A fabricator can alter the radiation pattern of the optically resonant system 400 by forming an asymmetric structure that radiates, preferentially, optical energy through the asymmetry of the optically resonant system 400. Such an asymmetrical structure could be accomplished by building the optically resonant system 400 with an asymmetrical structure. In other words, during the fabrication of the optically resonant system 400, at least one of the plates 401a–f or cylinders 402a–c, or a portion thereof, could be left out to cause the optically resonant system 400 to radiate, preferentially. It should be appreciated by one of ordinary skill in the art that such an asymmetrical structure could also be accomplished by removing a plate 401 or a cylinder 402, or a portion of a plate 401 or cylinder 402, from the optically resonant system 400 after fabrication.

The optically resonant system 400 of the invention can also be used as an out-of-plane coupler such as by structuring the optically resonant system as an axially symmetric resonant structure and embedding the optically resonant system 400 in an integrated optical device, as illustrated in FIG. 5. Inducing the optically resonant system 400 formed in an optical substrate to emit radiation out of the substrate surface, in one embodiment, is achieved by using fewer pairs of plates relative to the number of cylinders in the optically resonant system 400. The optically resonant system has a relatively high Q-factor, and couples to a plurality of evanescent fields extending outside the core of a proximal planar waveguide. The optically resonant system 400 is further structured to emit optical radiation in a direction orthogonal to the proximal planar waveguide. The resonant coupling between the proximal planar waveguide and the central cavity can be matched by appropriate design and relative placement of the two components, as is described in the above-cited patent application. The number of periods of reflectors (plates 401a–f and cylinders 402a–c) of the optically resonant system, in all dimensions, is chosen to achieve adequate coupling between the optically resonant system 400 and the proximal planar waveguide. The number of periods of reflectors of the optically resonant system can be further chosen to cause radiation out of the plane to be the dominant energy loss mechanism for the optically resonant system 400.

Using a structure in which the containment characteristics are asymmetrical for extracting energy from a planar waveguide has the advantage of emitting an out-of-plane signal from a single resonant mode, with an axially symmetric radiation pattern reflective of the radial symmetry of the resonant mode.

Figure 6:
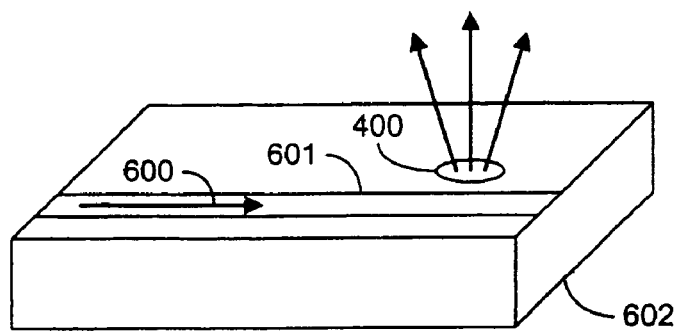
FIG. 6 is a schematic diagram illustrating a first functionality of the optically resonant system of FIG. 5.

Referring now to FIG. 6, shown is a schematic diagram illustrating a first functionality of the optically resonant system of FIG. 5. A physical process useful in order to understand the basic operation of the optically resonant system 400 is the mechanism by which an optical input signal 600 is coupled into the optically resonant system 400 from a nearby waveguide 601 in an optical substrate 602. Typical geometries are shown in FIGS. 6 and 7, where the waveguide modes can be either travelling or standing waves.

FIG. 6 illustrates an embodiment in which the optical input signal 600 is coupled into the optically resonant system 400 through evanescent fields surrounding the waveguide 601. These evanescent fields excite the modes of the resonant cavity of the optically resonant system 400 and transfer optical energy within the optically resonant system 400 from the waveguide 601. The optically resonant system 400 then radiates the optical energy from the surface of the substrate to form a second signal.

Figure 7:
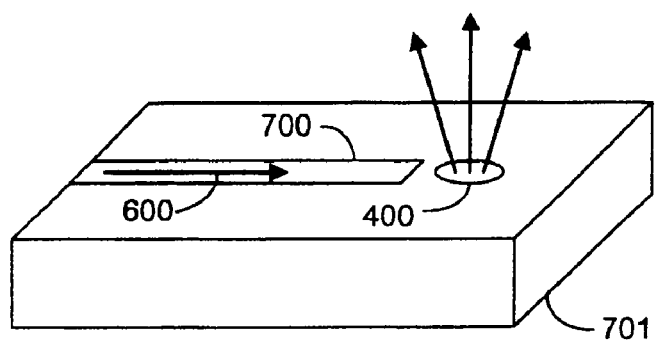
FIG. 7 is a schematic diagram illustrating alternative functionality of the optically resonant system of FIG. 5.

FIG. 7 illustrates an embodiment whereby the optical input signal 600 forms a standing wave that couples energy to the optically resonant system 400 via the evanescent fields surrounding waveguide 700 in substrate 701. The optically resonant system 400 through the resonant properties of the system captures optical energy of the optical input signal 600 and uses the optical energy to create an optical output signal. The optically resonant system 400 then emits the second optical signal through the substrate surface. It is assumed for each of these geometries that the waveguide modes are spatially normalizable, and have the bulk of their energy confined to the core of the waveguides 601 and 700, with calculable evanescent fields outside the core.

Figure 8:
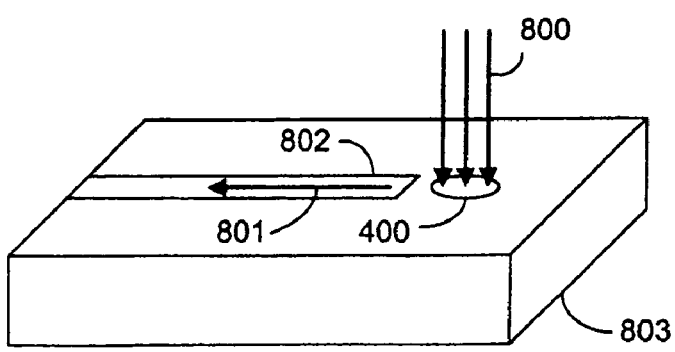
FIG. 8 is a schematic diagram illustrating alternative functionality of the optically resonant system of FIG. 5.

Referring now to FIG. 8, due to the reciprocity principle applicable to the passive nature of the optically resonant system 400, the system can also be used to couple energy into a waveguide of an integrated optical device from optical sources above the substrate surface. Here an optical input signal 800 is directed into the optically resonant system 400. The optically resonant system 400 then captures energy from the optical input signal and generates an optical output signal 801 and directs the optical output signal 801 into the waveguide 802 formed in the substrate 803. The optically resonant system in this embodiment could have an asymmetric containment characteristic that radiates substantially into the waveguide 802. As one skilled in the art will recognize this can be accomplished by forming the optically resonant system 400 with an asymmetrical structure in the radial direction.

Figure 9:
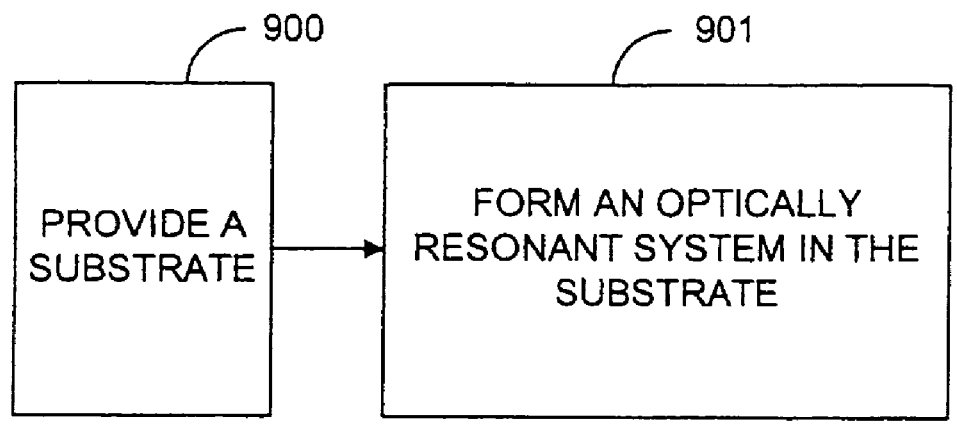
FIG. 9 is a flowchart illustrating a method for making the optically resonant system of FIG. 5.

Referring now to FIG. 9, shown is a flowchart illustrating a method for making the optically resonant system of FIG. 5. The first step 900, is to provide a substrate. After the substrate is provided, the next step 901 is to form a resonant cavity. Step 901 has been compressed in this process, but typically includes a series of fill and backfill steps marked by intermediate photolithography steps, as known to those skilled in the art. In order to fabricate the optically resonant system 400, the user can also fabricate a waveguide during step 901 of the present method for making the optically resonant system 400.

These etch and backfill steps typically could include using a layer by layer approach to fabricating the optically resonant system. As first step to the layer by layer approach mentioned above, a fabricator could etch at least one ring into an optical substrate formed from a first material, such as silicon dioxide. Next the fabricator could fill the ring(s) and deposit a plate with a second material, such as silicon. Then, the fabricator could deposit the first material over the plate, and repeat this process until a desired number of cylinders and plates have been fabricated.

Alternatively, the fabricator could first deposit a layer of the second material over the substrate. The fabricator could then etch the second material layer to form at least one ring over the substrate. Next, the fabricator could deposit a layer of the substrate first material to fill in the gaps in the ring layer. The fabricator could then deposit a plate layer of the second material, etch the plate, and fill in the gaps in the plate layer. Then the fabricator could repeat each these steps until a desired number of cylinders and plates have been formed. These fabrication methods are merely examples of fabrication methods that may be used, however, one skilled in the art will recognize that there exist numerous different methods to fabricate a given structure.

One skilled in the art will further recognize that the number of plates and cylinders defines a containment strength of the optically resonant system. The containment strength defines the ability of the optically resonant system 400 to keep a resonant signal contained within the optically resonant system after capturing the resonant signal. This containment strength can be increased or decreased according to the number of plates or cylinders that are included in the optically resonant system. Thus, the number of plates or cylinders can be adjusted to compensate for specific design considerations of each application. Furthermore, one skilled in the art will recognize that the fabricator can etch a completed optically resonant system 400 in order to adjust the optical power radiated from the resonant cavity.

Figure 10:
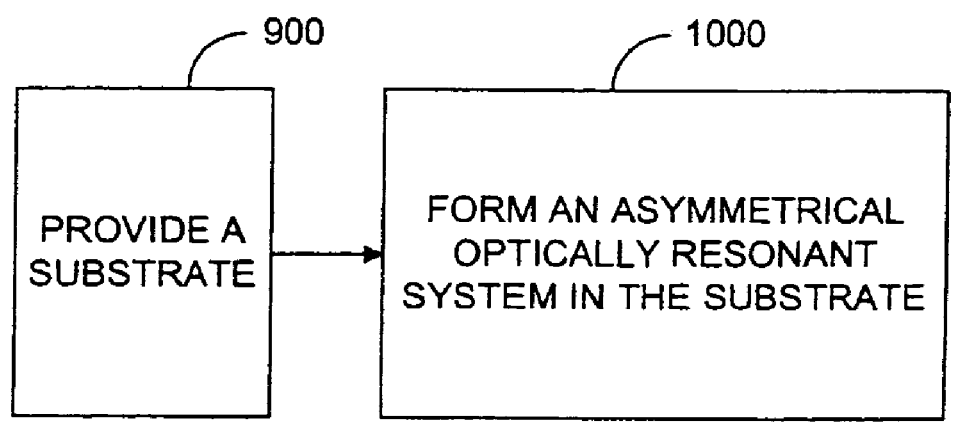
FIG. 10 is a flowchart illustrating an alternative method for making the optically resonant system of FIG. 5.

Referring now to FIG. 10, shown is a flowchart illustrating an alternative method for making the optically resonant system of FIG. 5. The first step is the same as the prior embodiment, shown in FIG. 9. However, the second step 1000 is different. Step 1000 allows the user to form an optically resonant system having an asymmetrical structure. Instead of forming a completely symmetrical structure, at least a portion of one or more of the outer plates or cylinders are left out during fabrication. Thus, an asymmetric optically resonant system is formed which will radiate, preferentially, toward the asymmetry in the structure.

Figure 11:
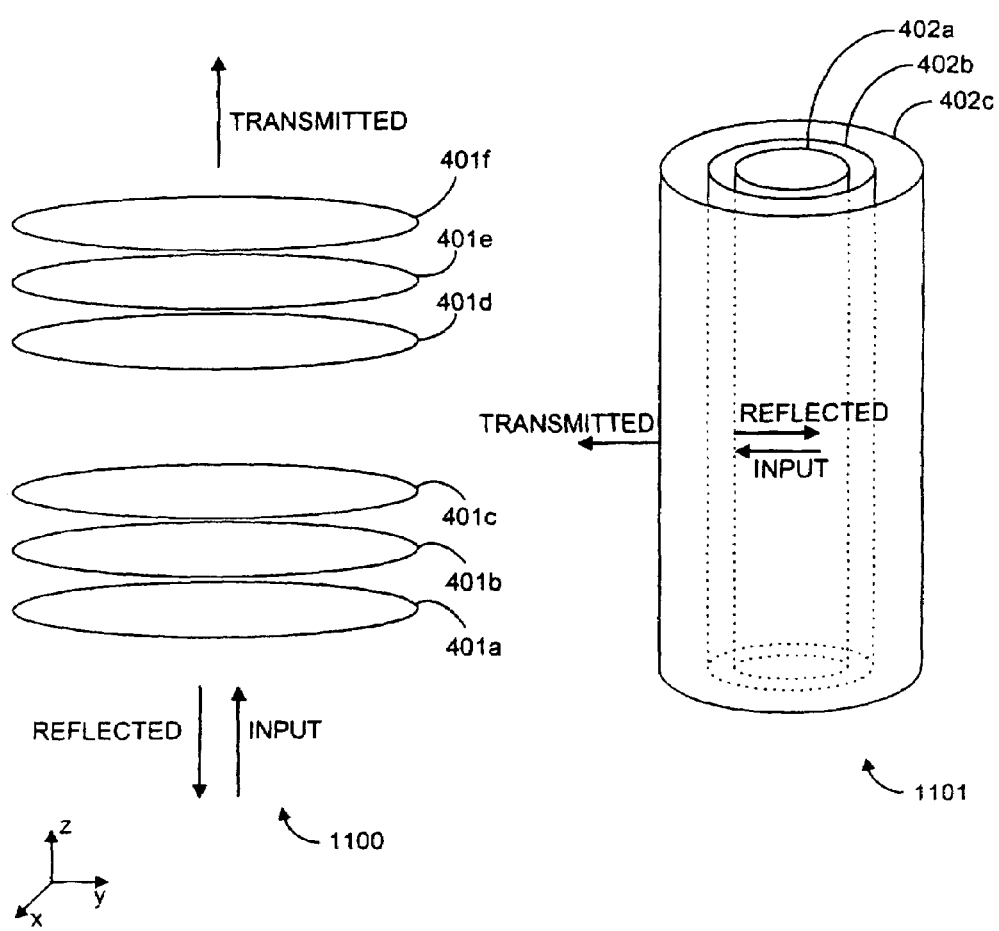
FIG. 11 is an illustration showing the operation of the optically resonant system of FIG. 5.

Referring now to FIG. 11, shown is an illustration demonstrating the operation of the optically resonant system of FIG. 5. The first structure 1100, includes a plurality of parallel plates 401a–f. These plates 401a–f lie in the x-y plane, and partially reflect optical energy in the direction of the z-axis, orthogonal to the x-y plane. Thus the first structure can be called a one-dimensional (1-D) reflector. The second structure 1101, includes a plurality of concentric cylinders 402a–c. The cylinders 402a–c partially reflect optical radiation radially from the cylinders 402a–c. Thus the second structure can be called a two-dimensional (2-D) reflector.

The first and second structures 1100, 1101 can work together without disrupting the coherent behavior of one another. This is best observed when a wave equation describing the azimuthal electric field for a Transverse Electric (TE) mode of the combined structure is written down $$\nabla^2 E_\phi(\rho, z) + k_o^2 \epsilon_\perp(\rho, z) E_\phi(\rho, z) = 0 \quad (1)$$

where $k_o$ is the free space k-vector for the specified frequency, $\rho$ is a radial distance (in the x-y plane), z is a distance along axis orthogonal to the radial axis, $E_\phi(\rho, z)$ is an electric field in polar coordinates, and $E_\perp(\rho, z)$ is the relative dielectric constant of the material of the first and second structures 1100, 1101, which are assumed to be the same. The relative dielectric constant, $E_\perp(\rho, z)$, is given by $$E_\perp(\rho, z) = 1 + (\epsilon_\perp' - 1)(f_1(\rho) + f_2(z) - f_1(\rho)f_2(z)) \quad (2)$$

where $$f_1(\rho) = \begin{cases} 1 & \text{inside cylinder} \\ 0 & \text{outside cylinder} \end{cases} \quad (3)$$

$$f_2(z) = \begin{cases} 1 & \text{inside plate} \\ 0 & \text{outside plate} \end{cases}$$

and $\epsilon_\perp'$, is the constant value of the dielectric constant of the first and second structures 1100, 1101. Note that Equation (1) would be completely separable except for the last term in Equation (2) describing the dielectric constant of the combined first and second structures. This term, proportional to $f_1(\rho)f_2(z)$, is required so that the dielectric constant value is not double-counted in the regions of intersection of the plates and cylinders 401a–f, 402a–c. If Equation (1) is not separable between the $\rho$ and z dimensions, then the set of plates 401a–f comprising the 1-D reflectors and the set of cylinders 402a–c comprising the 2-D reflectors do not act independently. Thus, the 1-D and 2-D reflectors could not be simply combined to create a 3-D confining structure.

For an appropriate mode choice, separability could be restored to an extremely high level of accuracy. This mode choice is the $TE_0$ resonant mode, which has electric field nulls at the inner surfaces of all plates and cylinders 401a–f, 402a–c, when following coherent design rules for the optically resonant system 400. Separability is restored when the electric field values experience a "double-null" (from the $\rho$ and z dimensions) at non-separable regions of intersection between the plates and cylinders 401a–f, 402a–c of the optically resonant system 400. Thus, the non-separable term can be deleted from the equation. The numerical error associated with this approximation can be shown to be extremely small using perturbative techniques.

The above equations, however, calculate for an optically resonant system in free space, as in FIG. 4. To calculate the relevant resonant modes of the optically resonant system 400 of FIG. 5, we restrict to the $TE_O$ mode, and the equation for magnetic field, $\vec{B}$, can be derived from Maxwell's equations. A complete description of this derivation is found in the above-cited patent application.

Referring back to FIGS. 4 and 5, the optically resonant system 400 structures can be used in any application where it is desired to extract optical energy from a substrate surface. Optical energy can be coupled from virtually any integrated optical device to the optically resonant system 400 through evanescent fields, and ultimately directed out of the substrate surface in the form of optical energy. These integrated optic structures can range from waveguides to resonant structures, and the coupling to the optically resonant system can be accurately controllable in a calculable way. The optical energy radiated out of the substrate surface can be directed to other devices or detectors via free-space transmission, or efficiently collected by an optical fiber. The radiated optical energy is ideally suited for coupling into an optical fiber, since the output beam has a circular symmetry and a beam diameter on the order of the output wavelength. Additionally, multiple optically resonant systems 400 can be fabricated on a single integrated optic device. Due to the wavelength specific nature of these optically resonant systems 400, it is possible to have all of the couplers operating at the same wavelength, or a series of wavelengths. In all of these applications, the fabrication steps involved in producing an optically resonant system 400 are compatible with the standard growth procedures of typical integrated optic devices. The two-material structures can be grown by a process of selective etching and back-filling during the fabrication of the associated integrated optics device.

Detailed design rules of the optically resonant system are described in the above-cited patent application. An example of an optically resonant system includes three cylinders and six plates, the plates and cylinders made from silicon ($\kappa$=11.56), while an optical substrate is made from silicon dioxide ($\kappa$=2.25). To capture an optical signal having a wavelength of 1.55 μm, the first cylinder 402a would have an inner radius of 1.140 μm, and an outer radius of 1.265 μm. The second cylinder 402b, would have an inner radius of 1.737 μm and an outer radius of 1.860 μm. Finally, the third cylinder would have an inner radius of 2.329 μm and an outer radius of 2.452 μm. Each of the plates would have a thickness of 0.1175 μm, with 0.310 μm spacing between each of the plates, with the exception of the plates bordering the central cavity. The plates 401c, 401d bordering the central cavity would have a spacing of 0.620 μm between them. Thus, the resonant optical cavity, in one embodiment, among others, could have a height of 0.620 μm and a radius of 1.140 μm, in order to capture an optical signal with a wavelength of 1.55 μm.

Figure 12:
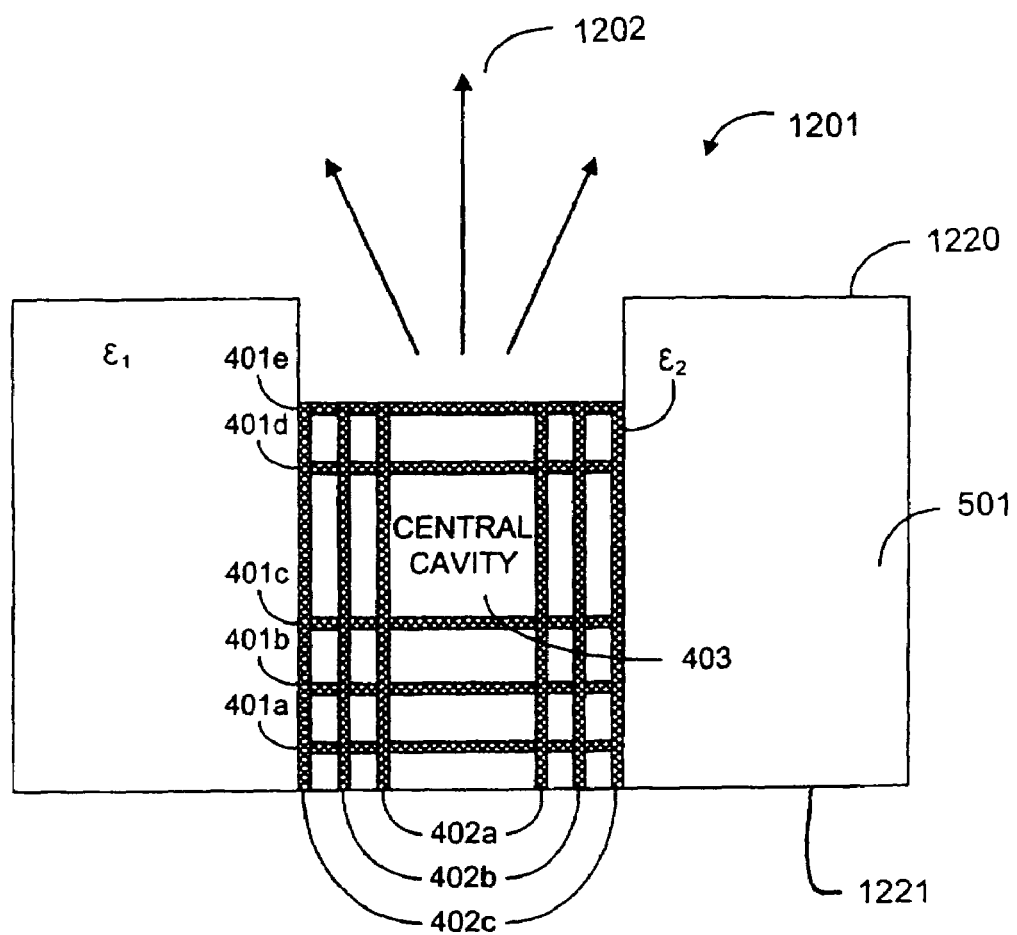
FIG. 12 is a cross-sectional view of the optically resonant system of FIG. 5, without a top plate of the optically resonant system.

Referring now to FIG. 12, shown is an asymmetric optically resonant cavity. In order to enable the optically resonant system 400 to preferentially radiate light out of the substrate surface plane 1220, the optically resonant system is formed asymmetrically by forming the optically resonant system without an even number of plates 401a–e. In this way, the dominant radiation mechanism for the asymmetric optically resonant system 1201 is no longer in the radial direction into the substrate 501, but is out of the plane relative to the surfaces 1220 and 1221 of the substrate, as indicated by radiation 1202 in FIG. 12.

Calculation of the optical radiation of the asymmetric optically resonant system 1201 is difficult for a number of reasons. The removal of the confining boundary condition at the upper surface precludes an analytical solution for a radiating resonant mode. Also, the radiation resonant modes are not normalizable, making an approximate mode matching procedure unworkable. As a result, the best means of approximately calculating the radiation properties of the structure of FIG. 12 is perturbative.

As a typical example, a structure including ten cylinder regions and three plate pair regions, with dielectric constants of 11.56 and 2.25 for the optically resonant system 1201 and background regions 501, respectively, is specified using the design rules. For the complete optically resonant system 400, without any asymmetric structure to enhance out-of-plane radiation, the computed Q of the resonator is $1.0 \times 10^8$, when no materials losses are taken into account. This computed Q is only due to radiation losses in the radial direction into the substrate 501. A measured Q would, of course, be much lower due to materials losses. If the optically resonant system 400 is built asymmetrically without the top high-dielectric plate region, radiation out of the substrate is calculated to generate a Q of $2 \times 10^6$. In other words, for the resonant mode of the asymmetric optically resonant system 1201, roughly 50-times more energy is likely to escape through the upper surface of the asymmetric optically resonant system 1201 than leak into the substrate 501. If the optically resonant system 1201 is built asymmetrically without the top two high-dielectric plate regions, radiation out of the substrate is calculated to generate a Q of $5.7 \times 10^4$. For this configuration, it is seen that the asymmetrical optically resonant system 1201 radiates very strongly out of the substrate, with roughly 2000-times more energy radiated out of the substrate than into the substrate. From the example, it is clear that the coupling of the asymmetric optically resonant system resonant modes to radiation fields out of the substrate can be adjusted over a very broad range.

In sum, an efficient out-of-plane coupler has been realized using an optically resonant system with a resonant cavity that can be formed in an integrated optic device. The optically resonant system can transfer optical energy from a proximal component of the integrated optic device, such as a waveguide, and direct it out of the optically resonant system with calculable coupling efficiency. Additionally, the output of the optically resonant system has the advantage of being axially symmetric, with a beam diameter on the order of the radiation wavelength.

In certain applications, it is desirable to modify at least one characteristic of the resonant signal that is emitted from the optically resonant system. In an embodiment in accordance with the invention, an optical structure is formed on a surface of the optically resonant system to modify a characteristic of the emitted resonant signal. For example, the optical structure is configured to impart a phase-shift on a portion of the resonant signal. Because the resonant signal consists of a single resonant mode with an axially symmetric radiation pattern, the phase-shift can be used to, for example, collimate, disperse, direct, and generally shape output characteristics of the emitted resonant signal. The optical structure can also be used to tune the Q of the optically resonant system.

Figure 13A:
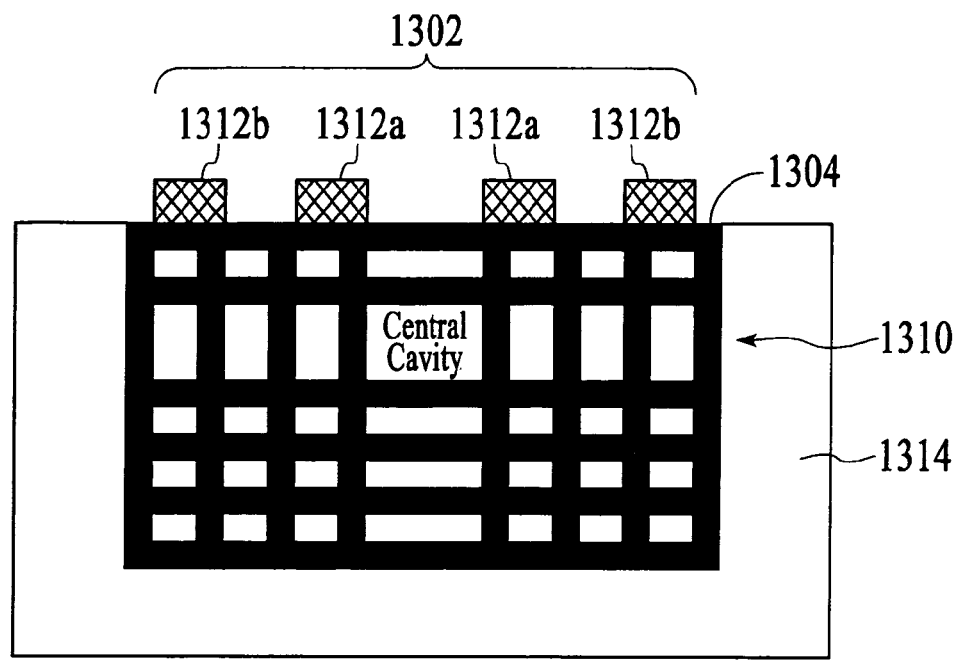
FIG. 13A depicts a cross-sectional side view of an optical structure that is formed on a surface of an optically resonant system to modify a characteristic of an emitted resonant signal.
Figure 13B:
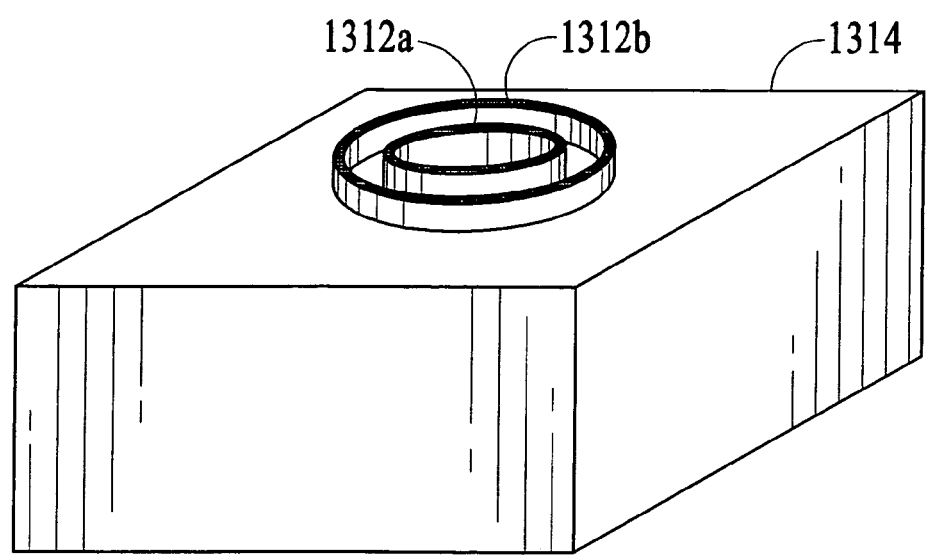
FIG. 13B depicts a perspective view of the concentric rings shown in FIG. 13A.

FIG. 13A depicts a cross-sectional side view of an optical structure 1302 that is formed on a surface 1304 of an optically resonant system 1310 to modify an emission characteristic of an emitted resonant signal. In the example of FIG. 13A, the optical structure 1302 consists of concentric rings 1312a and 1312b of dielectric material that are grown on the top surface of the optically resonant system, where the optically resonant system 1310 is formed in a substrate 1314. FIG. 13B depicts a perspective view of the concentric rings 1312a and 1312b shown in FIG. 13A. The concentric rings 1312a and 1312b are sized and located to selectively impart a phase-shift on a portion of the emitted resonant signal. In an embodiment, the optical structure 1302 is formed of silicon dioxide using the same lithographic fabrication techniques that are used to form the optically resonant system 1310.

Figure 14:
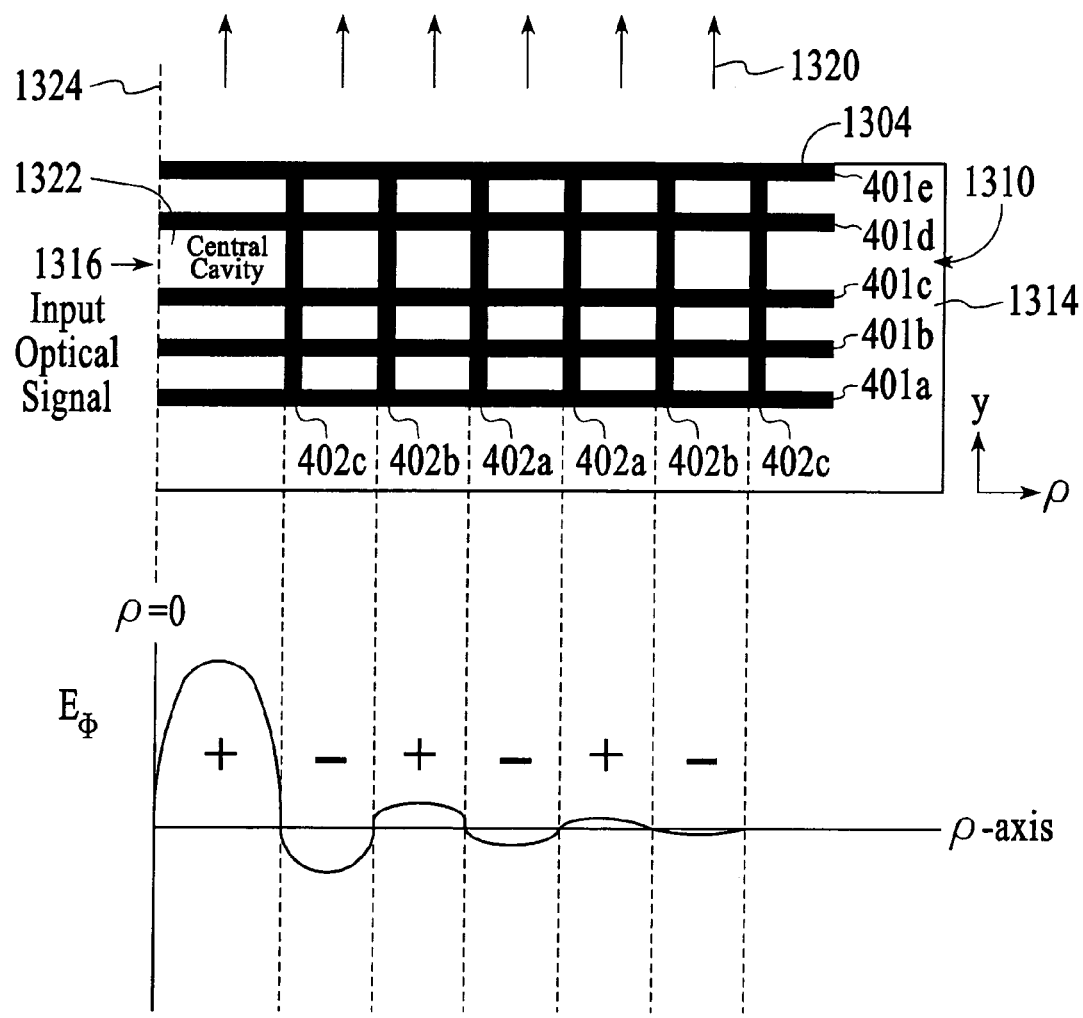
FIG. 14 depicts a cross-sectional side view of one-half of an optically resonant system relative to a snapshot of the amplitude of the electric field, $E_\varphi$ as a function of the distance, $\rho$, away from the center axis of the optically resonant structure.
Figure 15:
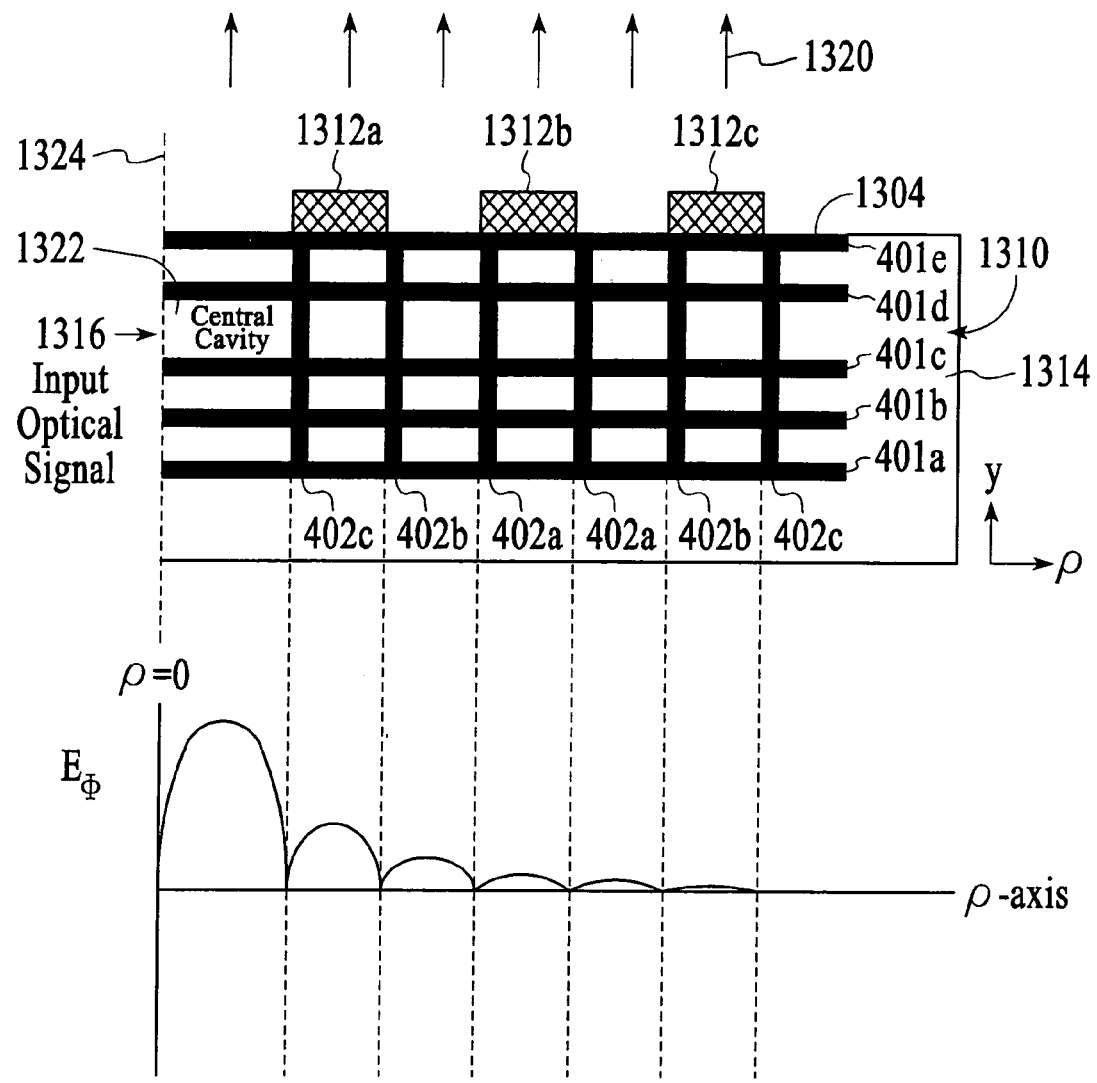
FIG. 15 depicts a cross-sectional side view of one-half of an optically resonant system with an optical structure formed on the top surface relative to a snapshot of the amplitude of the electric field, $E_\varphi$, as a function of the distance, $\rho$, away from the center axis of the optically resonant structure.
Figure 16:
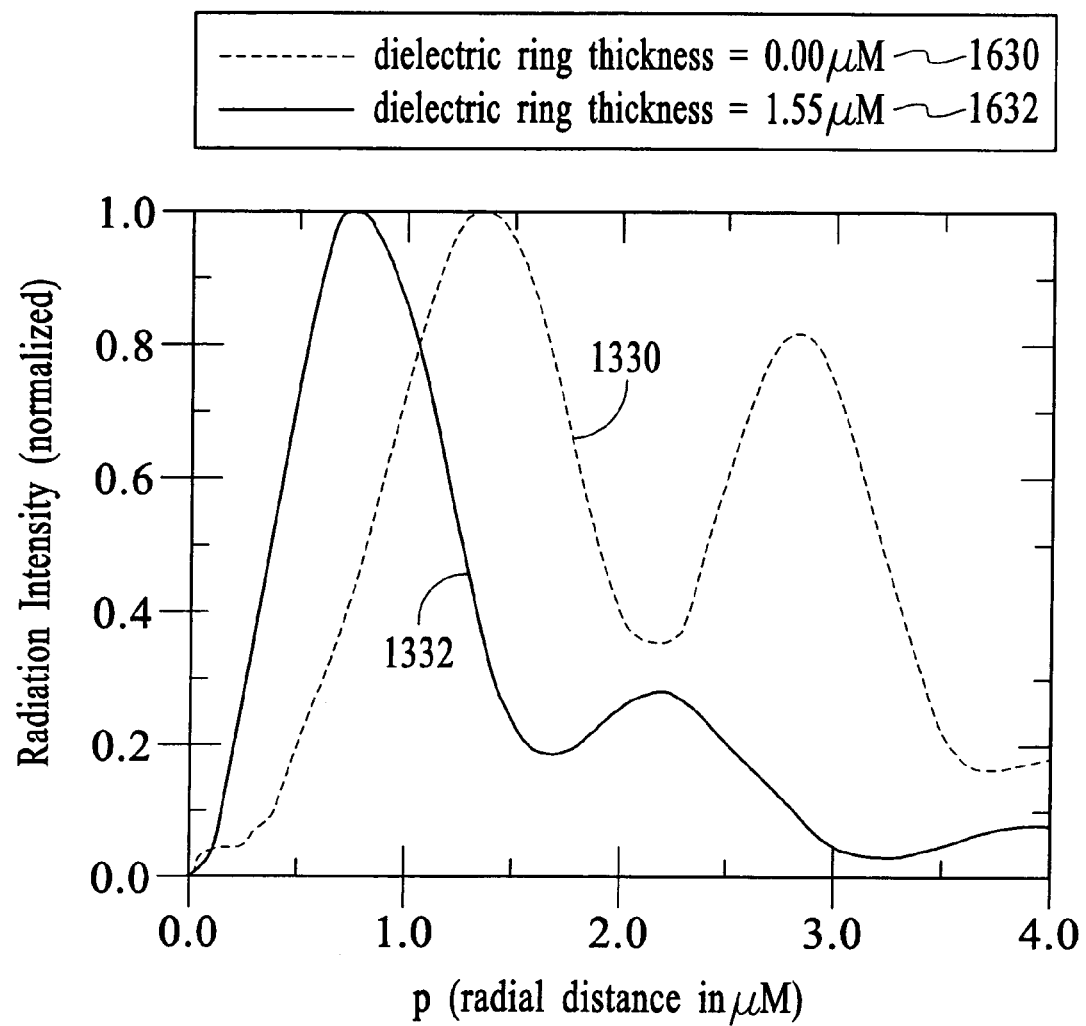
FIG. 16 depicts exemplary graphs of the normalized radiation intensity at the surface of an optically resonant system versus the distance, $\rho$, away from the center axis of the resonant cavity.

Design considerations of the optical structure are described herein with reference to FIGS. 14–16. The top portion of FIG. 14 depicts a cross-sectional side view of one-half of an optically resonant system 1310 as described above with reference to FIGS. 1–12. For description purposes, the optically resonant system 1310 is shown without the optical structure 1302 as described with reference to FIGS. 13A and 13B. The optically resonant system 1310 depicted in FIG. 14 is designed to resonate an input optical signal 1316 at 1.55 µm and is formed in a substrate 1314 of silicon dioxide, with the silicon dioxide having a dielectric constant of 2.25. The first and second structures 401a–e and 402a–c of the optically resonant system are formed of pure silicon, with the pure silicon having a dielectric constant of 11.56. In the example embodiment of FIG. 14, the circular plates that make up the first structure 401a–e of the optically resonant system 1310 have a diameter of approximately 3 µm, a thickness of approximately 0.1175 µm, and spacing between circular plates in the y-direction of approximately 0.620 µm for the inner two plates and 0.310 µm for the additional plates. The concentric cylinders that make up the second structure 402a–c of the optically resonant system 1310 have inner and outer diameters of approximately 1.140/1.265, 1.737/1.860, and 2.329/2.452 µm, respectively. The spacing of the concentric cylinders defines annular regions of silicon dioxide between adjacent concentric cylinders. As described above, a resonant signal 1320 is emitted from the optically resonant system in an out-of-plane direction in response to the input optical signal 1310 (e.g., an optical signal at 1.55 µm). An electric field component, $E_\varphi$, at the surface 1304 of the optically resonant system has an amplitude whose phase oscillates with time and decreases exponentially as a function of the distance, ρ, away from the center axis 1324 of the central cavity 1322. A snapshot of the amplitude of the electric field, $E_\varphi$, as a function of the distance, ρ, away from the center axis 1324 of the central cavity 1322 is illustrated in the bottom portion of FIG. 14 relative to the optically resonant structure 1310. For the resonant field mode, the electric field oscillations have their zeros at the inner surfaces of each of the concentric cylinders of the optically resonant system. The electric field amplitude is of opposite sign on either side of the field zeros, forming concentric annular regions of electric field with alternating polarity that correspond to the annular regions between the concentric cylinders of the optically resonant system. As a result of the alternating polarities of the electric field, $E_\varphi$, and in a direction perpendicular to the surface of the substrate and the circular plates, the electric field receives destructively interfering contributions from the adjacent and oppositely polarized annular regions. The destructively interfering contributions cause the beam profile of the resonant signal to be skewed away from the surface normal to the substrate surface with a distribution that is governed by the field amplitudes and phases of the various annular regions.

To produce an emission profile that is more peaked toward the surface normal (i.e., that is perpendicular to the surface of the optically resonant system and the substrate, an optical structure consisting of a set of dielectric rings is formed over annular regions of the same polarity. For example, as shown in FIG. 15, three flat concentric ring structures 1312a–c of silicon dioxide are formed over the annular regions that exhibit negative polarity (as shown in FIG. 14). The thickness of the concentric rings is selected as a function of the wavelength of the resonant signal. In the embodiment of FIG. 15, the concentric rings are formed at a thickness that imparts a 180 degree phase-shift (i.e., a shift in the temporal phase of the polarity) on the portions of the resonant signal that pass through the concentric rings. Assuming an input signal of 1.55 µm and that the dielectric constant of the rings is 2.25, the thickness of the rings is set to 1.55 µm to impart a 180 degree phase-shift. The 180 degree phase-shift caused by the concentric rings effectively reverses the polarity at the corresponding annular regions as illustrated in the graph on the bottom of FIG. 15. As a result of the phase-shift and in a direction perpendicular to the surface 1304 of the optically resonant system 1310 and the substrate 1314, the emitted radiation field receives constructively interfering contributions from all of the annular regions. Because of the constructive interference, the angular distribution of the emitted resonant signal becomes much more peaked normal to the substrate surface.

FIG. 16 depicts exemplary graphs of the normalized radiation intensity 1330 and 1332 at the surface 1304 of the optically resonant system versus the distance, ρ, away from the center axis of the resonant cavity. The exemplary graphs include the case of no optical structure (e.g., ring thickness=0 µm, identified by intensity line 1330) and the case of an optical structure of flat concentric rings of silicon dioxide with thicknesses of 1.55 µm (identified by intensity line 1332). As shown in FIG. 16, the radiation intensity 1332 is much more tightly focused around the direction normal to the substrate surface when the concentric rings are present.

The above-described concentric rings formed on the top surface of an optically resonant system can be configured differently to achieve different results. For example, the optical structure may include portions of rings or rings with different or varying thicknesses. In particular, the thickness of the rings could vary from ring to ring or vary within the same ring. In the embodiment of FIG. 15, the thickness of the concentric rings 1312a–c is chosen to cause radiation emanating from the surface of the optically resonant system and passing through a concentric ring to acquire an additional phase shift of 180 over what it would have acquired propagating in empty space. Although a 180 degree phase-shift is selected in this embodiment, different degrees of phase-shift are possible depending on the emission characteristic that is desired. Further, the concentric rings may be of any material composition which affects the desired emission characteristics.

Modification of the emitted radiation fields using an optical structure formed on the surface of an optically resonant system also affects the coupling efficiency of the optically resonant structure. Specifically, the optical structure affects the Q of the optically resonant system relative to the proximal integrated optic waveguiding structures. For example, the Q of the optically resonant system 1310 described with reference to FIGS. 14 and 15 increases significantly when the concentric rings 1312a–c are added. Therefore, an optical structure such as concentric rings-formed on a surface of the optically resonant system can also be used in a final stage of fabrication to tune the coupling properties of the optically resonant system.

Figure 17:
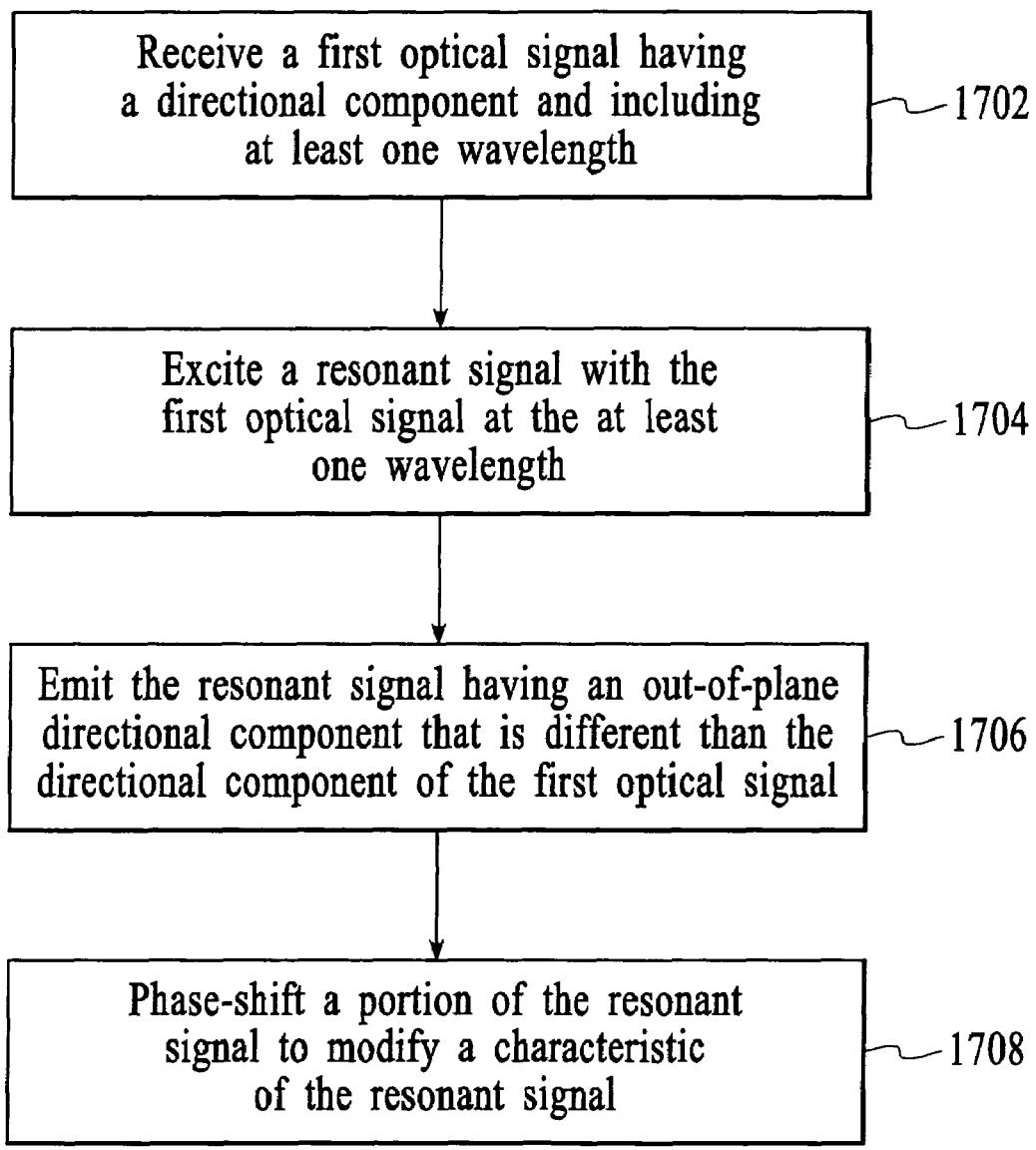
FIG. 17 depicts a process flow diagram of a method for redirecting optical radiation.

FIG. 17 depicts a process flow diagram of a method for redirecting optical radiation. At block 1702, a first optical signal is received having a directional component and including at least one wavelength. At block 1704, a resonant signal with the first optical signal at the at least one wavelength is excited. At block 1706, the resonant signal is emitted having an out-of-plane directional component that is different than the directional component of the first optical signal. At block 1708, a portion of the resonant signal is phase-shifted to modify a characteristic of the resonant signal.

It should be emphasized that the above-described embodiments of the present invention are merely possible examples of implementations set forth for a clear understanding of the principles of the invention. Many variations and modifications may be made to the above-described embodiment(s) of the invention without departing substantially from the principles of the invention. All such modifications and variations are intended to be included within the scope of this disclosure and the present invention and protected by the following claims.

What is claimed is:

1. A system for redirecting an optical signal, said system comprising:
    a substrate having first and second surfaces that are substantially parallel to a plane;
    an optically resonant system formed in the substrate and configured to capture at least a portion of a first optical signal propagating substantially parallel to the plane and to emit a resonant signal in an out-of-plane direction relative to the substrate; and
    an optical structure, formed on a surface of the optically resonant system, which is configured to modify a characteristic of the emitted resonant signal.

2. The system of claim 1 wherein the optical structure comprises a concentric ring structure.

3. The system of claim 1 wherein the optical structure comprises a plurality of concentric ring structures.

4. The system of claim 1 wherein the optical structure is a dielectric structure that is lithographically fabricated on a surface of the optically resonant system to impart a phase-shift on the emitted resonant signal.

5. The system of claim 1 wherein the optical structure is configured to phase-shift a portion of the emitted resonant signal.

6. The system of claim 1 wherein the optically resonant system includes a first structure and a second structure:
    the first structure residing substantially parallel to the plane and reflecting optical radiation in a first direction substantially orthogonal to said plane; and
    the second structure overlapping, and optically communicating with said first structure, and reflecting optical radiation in a direction substantially parallel to said plane;
    wherein said first and second structures operate to capture at least a portion of a first optical signal propagating substantially parallel to said plane by exciting a resonant signal in a resonant cavity through resonant characteristics of said first and second structures, and further operate to emit said resonant signal in a second direction substantially orthogonal to said plane.

7. The system of claim 6 wherein the optical structure comprises a plurality of concentric ring structures.

8. The system of claim 7 wherein the concentric ring structures are configured as a function of the second structure.

9. The system of claim 7 wherein the second structure includes concentric cylinder structures and wherein the concentric ring structures are configured as a function of the concentric cylinder structures.

10. The system of claim 9 wherein the concentric ring structures are formed over annular regions of common polarity, where the annular regions are regions between the concentric cylinder structures.

11. The system of claim 1 wherein the optical structure is configured as a function of structures that form the optically resonant system.

12. The system of claim 1 wherein the optical structure has a thickness that is a function of the wavelength of the emitted resonant signal.

13. A system for redirecting an optical signal, the system comprising:
a substrate having first and second surfaces that are substantially parallel to a plane;
an optically resonant system formed in the substrate and configured to form a resonant cavity, the resonant cavity being operative to receive a first optical signal, the first optical signal exhibiting a directional component that is substantially parallel to the plane, the resonant cavity resonating in response to the first optical signal to excite and emit a resonant signal, the resonant signal being emitted in an out-of-plane direction relative to the substrate; and
an optical structure, formed on a surface of the optically resonant system, which is configured to modify a characteristic of the emitted resonant signal.

14. The system of claim 13 wherein the optical structure comprises a plurality of concentric ring structures.

15. The system of claim 13 wherein the optical structure is configured to phase-shift a portion of the emitted resonant signal.

16. The system of claim 13 wherein the resonant cavity is bounded by a first structure residing substantially in a plane and reflecting optical radiation in a first direction substantially orthogonal to the plane and a second structure optically communicating with the first structure and reflecting optical radiation in a direction substantially parallel to the plane.

17. The system of claim 16 wherein the optical structure comprises a plurality of concentric ring structures that are configured as a function of the second structure.

18. A method for redirecting optical radiation, the method comprising:
receiving a first optical signal in an optical system having first and second surfaces that are substantially parallel to a plane, the first optical signal having a directional component that is substantially parallel to the plane and including at least one wavelength;
exciting a resonant signal in response to the first optical signal at the at least one wavelength;
emitting the resonant signal in an out-of-plane direction relative to the substrate; and
phase-shifting a portion of the resonant signal that is emitted in the out-of-plane direction to modify a characteristic of the resonant signal.

19. The method of claim 18 further comprising passing the resonant signal through an optical structure that is formed as a function of the wavelength of the resonant signal.

20. The method of claim 18 further comprising phase-shifting portions of the resonant signal at regions of common polarity.

* * * * *